United States Patent [19]

Kubota et al.

[11] 4,434,819

[45] Mar. 6, 1984

[54] COIL FORMING MACHINE

[75] Inventors: Tadashi Kubota, Katano; Tokuhito Hamane, Hirakata; Masaaki Tasai, Kadoma, all of Japan

[73] Assignee: Matsushita Electric Industrial Co., Ltd., Kadoma, Japan

[21] Appl. No.: 325,119

[22] Filed: Nov. 27, 1981

[30] Foreign Application Priority Data

Dec. 3, 1980 [JP] Japan .................................. 55-171228

[51] Int. Cl.³ ............................................... B21F 3/00
[52] U.S. Cl. ....................................... 140/92.1; 242/83; 242/7.14
[58] Field of Search ......................... 140/92.1; 72/710; 29/596; 242/81, 82, 83, 7.14

[56] References Cited

U.S. PATENT DOCUMENTS 3,770,025 11/1973 Hirschfelder et al. ................ 242/83
4,296,784 10/1981 Rodenbeck et al. .................. 29/596

Primary Examiner—Francis S. Husar
Assistant Examiner—Linda McLaughlin
Attorney, Agent, or Firm—Wenderoth, Lind & Ponack

[57] ABSTRACT

A coil forming machine comprises a coil former assembly for the formation of a coil therearound, a flier for winding a wire around the former assembly to form the coil and a coil receiving jig for the support of the coil which has been transferred from the former assembly. The former assembly is provided with a high frequency energy generator for converting electrical energies into mechanical energies and an amplitude transducer for increasing mechanical vibrations generated by the generator.

3 Claims, 6 Drawing Figures

COIL FORMING MACHINE

The present invention relates to a machine for forming a coil for a stator of an electric motor and, more particularly, to a coil forming machine of a type wherein a coil being formed around a coil former assembly is allowed to fall onto a receiving jig.

A typical prior art coil forming machine will first be described with reference to FIGS. 1 and 2 of the accompanying drawings.

In FIGS. 1 and 2, 1 designates an electric wire, 2 designates a flier through which the wire 1 extends, and 3 represents a coil receiving jig. Numerals 4 and 5 designate respective support plates for carrying movable and fixed coil formers 6 and 7, respectively said movable coil former 6 having a plurality of winding steps 6a, 6b, 6c and 6d and said fixed coil former 7 having a corresponding number of winding steps 7a, 7b, 7c and 7d and also an opening 7e adapted to receive the coil receiving jig 3 therethrough. Numeral 8 designates a carrier plate, and 9 and 10 designate respective retainer plates through which the associated support plates 4 and 5 are rigidly secured to the carrier plate 8. Numeral 11 designates a tiltable plate, 12 designates a spherical bearing, 13 designates coil ejecting rods, 14 designates bearing sleeves through which the associated rods 13 are axially slidably supported, 15 designates a support shaft to which the carrier plate 8 is rigidly secured, and 16 represents a coil.

In the construction described above, when the coil receiving jig 3 is positioned below and in alignment with the fixed coil former 7, the support shaft 15 is lowered to cause the coil receiving jig 3 to be inserted into the opening 7e in the fixed coil former 7 with the winding step 7a engaged with blades 3a. Subsequent movement of the flier 2, with the wire 1 extending therefrom, along a circular orbit X results in the winding of the wire 1 around the winding steps 6a and 7a to form a first-stage coil 16. During this time, the free end of the wire 1 is caught by a lead wire cutter (not shown) but can be released therefrom after the coil 16 having a predetermined number of turns has been completed. In synchronism with the movement of the flier 2 along the circular orbit X, the tiltable plate 11 undergoes a rocking motion which is in turn transmitted to the rods 13 to reciprocate the latter in their axial direction so that the coil 16 being formed on the winding steps 6a and 7a is shifted downwards towards the coil receiving jig 3 and finally caused to fall onto the jig 3. After the completion of the formation of the first-stage coil, the support shaft 15 is again lowered to cause the step 7b to engage the blades 3a so that the wire 1 from the end of the first-stage coil which has been wound around the steps 6a and 7a by the flier 2 can then be wound on the steps 6b and 7b to form a second-stage coil. In this way, subsequent coils, i.e., third-stage and fourth-stage coils are sequentially formed one after another around the steps 6c and 7c and the steps 6d and 7d.

In the prior art machine of the type described above, transportation of the individual coils from the former assembly, composed of the formers 6 and 7, onto the coil receiving jig 3 is forcibly performed by the utilization of the ejecting rods 13.

However, the employment of the ejecting rods 13 has been found to pose some problems. By way of example, as the winding speed increases with the correspondingly increased speed of reciprocation of the ejecting rods 13, the coil formed on the former assembly is downwardly pushed by the ejecting rods 13 at a speed of, for example, 5,000 mm/sec where the rods 13 are spaced 50 mm from the shaft 15, the tiltable plate 11 is inclined at 11° and the flier 2 is rotated at 1,800 r.p.m. This means that some turns of the coil facing the rods 13 are severely beaten by the reciprocating rods 13, thereby causing damage to the coil. Moreover, the rocking motion of the tiltable plate 11 is accompanied by increased frictional resistance constituting a source of increased noise.

Another prior art coil forming machine is schematically illustrated in FIGS. 3 and 4 and will now be discussed with reference thereto.

FIG. 3 illustrates a longitudinal sectional representation of a coil former assembly and FIG. 4 illustrates, on an enlarged scale, the state in which the wire 1 has been wound on the former assembly. One of the features of this coil former assembly shown in FIG. 3 is that each winding step is downwardly tapered and another feature is transition that each upper region of the steps is rounded radially inwardly of the former assembly. This design has been developed with a view to substantially allowing the formed coil to be downwardly shifted by a vector component $F_1$ of the winding force $F_0$ which, as shown in FIG. 4, acts in a direction around the former assembly. However, it has been found that since the force necessary to push the coil downwards is a vector component of the winding force as hereinabove described, the wire being wound around the former assembly tends to be excessively tensioned, resulting in elongation of the wire and also the formation of relatively large interstices among the turns of the wire forming the coil.

Furthermore, in the machine utilizing the former assembly described with reference to FIGS. 3 and 4, high speed winding of the wire to form the coil tends to result in generation of an insufficient force necessary to push the coil downwards and also in an irregular pattern in which the wire is wound. In addition, a smooth transfer of the coil from the former assembly onto the coil receiving jig can not be performed easily.

The present invention has been developed with a view to substantially eliminating the disadvantages inherent in the prior art coil forming machines and will be described in detail in connection with a preferred embodiment thereof with reference to the accompanying drawings, in which.

Figure 5:
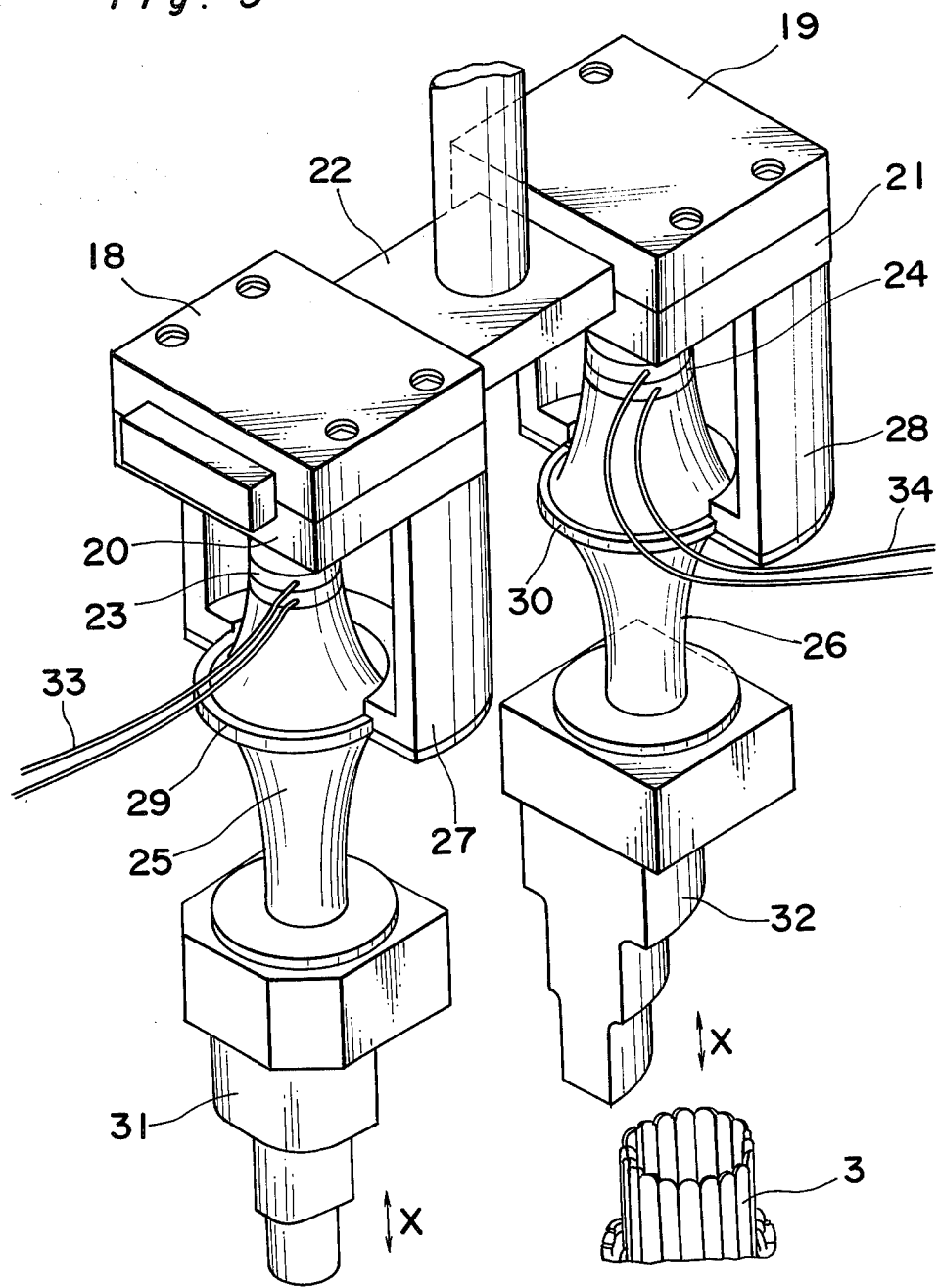
FIGS. 5 and 6 are perspective views of a coil former assembly according to different embodiments of the present invention.

Referring first to FIG. 5, 18 and 19 designate retainer plates through which support plates 20 and 21 for the support of associated coil formers 31 and 32 are rigidly secured to a carrier plate 22. Numerals 23 and 24 designate high frequency energy generators for convering electrical energy into mechanical vibrations, and 25 and 26 designate amplitude transducers operatively associated with the respective generators 23 and 24 for increasing the mechanical vibrations generated by the generators 23 and 24. Numerals 27 and 28 designate support stands engaging flanges 29 and 30 on the associated amplitude transducers for supporting transducers 25 and 26 and also the coil formers 31 and 32. These support stands 27 and 28 are rigidly secured to the associated support plates 20 and 21.

In the construction described above, a high frequency current generated by a high frequency oscillator (not shown) is supplied to both of the high frequency energy generators 23 and 24 through supply lines 33 and 34 to convert the electrical vibrations into the mechanical vibrations. The amplitude of the mechanical vibrations so generated is increased by the amplitude transducers 25 and 26 and the amplitude-increased mechanical vibrations are utilized to vibrate the coil formers 31 and 32 in the respective directions as shown by the arrows X in FIG. 5.

Because of the high frequency vibration, the coil formed on the coil former assembly composed of the formers 31 and 32 is smoothly shifted downwards onto a coil receiving jig 3.

Figure 6:
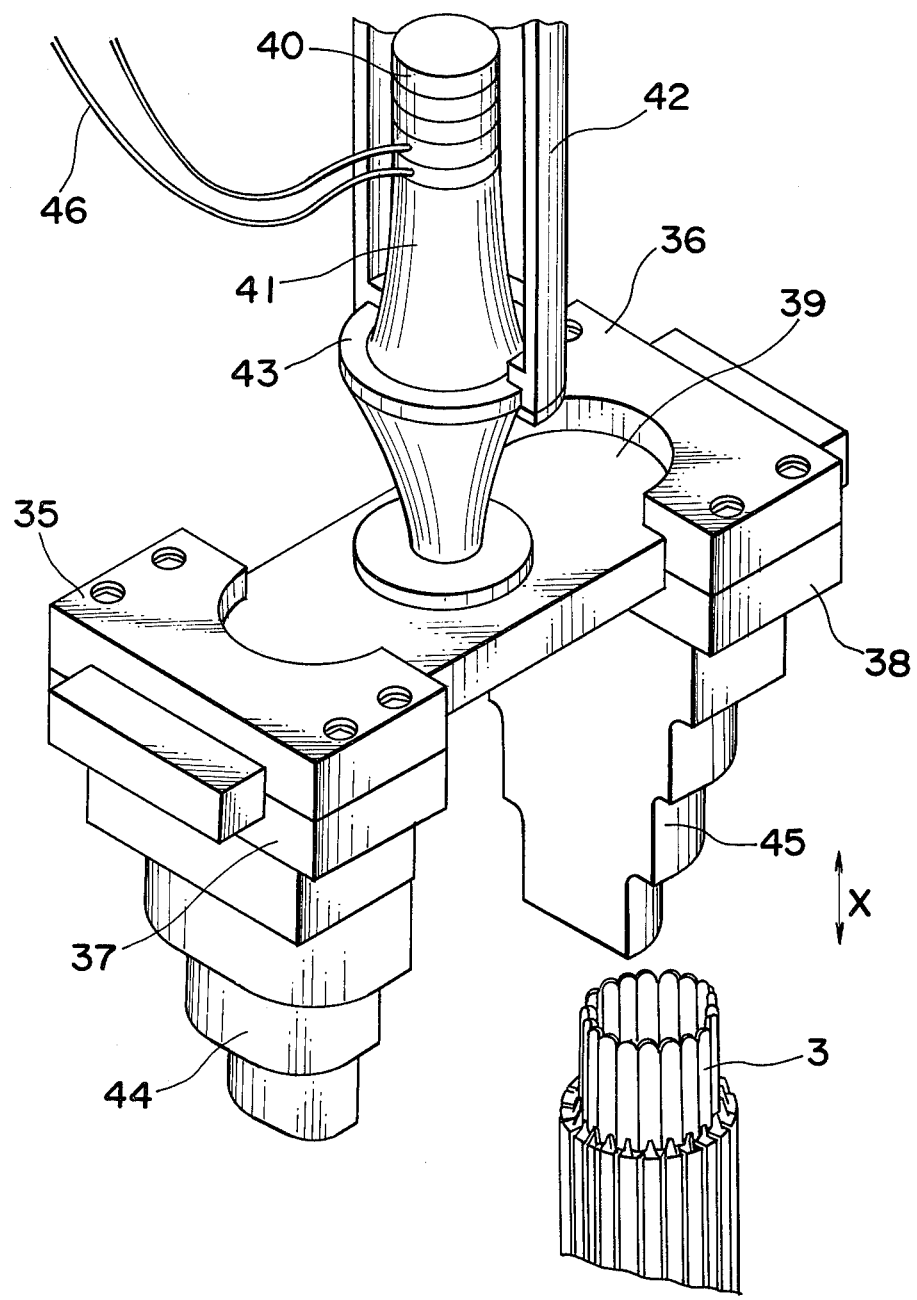

Referring now to FIG. 6, numerals 35 and 36 designate retainer plates through which support plates 37 and 38 for the support of coil formers 44 and 45 are rigidly secured to a carrier plate 39. Numeral 40 designates a high frequency energy generator supplied by a high frequency oscillator (not shown) through supply lines 46, numeral 41 designates an amplitude transducer, 42 designates a support stand, and 43 designates a flange. The retainer plates 35 and 36, the support plates 37 and 38, the carrier plate 39, the formers 44 and 45, the generator 40 and the transducer 41 are suspended from support stand 42 through the flange 43, and the generator 40 converts the electrical vibrations from the high frequency oscillator into mechanical vibrations which are, after the amplitude thereof has been increased by the transducer 47, in turn applied to the retainer plates 35 and 36, the carrier plate 39, the support plates 37 and 38 and the formers 44 and 45 to vibrate them in directions shown by the arrow X in FIG. 6.

Because of the high frequency vibration, the coil formed on the former assembly composed of the formers 44 and 45 can smoothly be shifted downwards onto a coil receiving jig 3 in a manner similar to that in the foregoing embodiment.

Thus, as compared with the machine wherein the ejecting rods are utilized, in the present invention no ejecting rod is required and, therefore, the tiltable plate, the spherical bearing and the bearing sleeve are not required. This means that the machine according to the present invention has a simple structure and is free from mechanical vibrations which would otherwise constitute a cause of noise, providing a relatively large freedom of design choice in connection with the former assembly. Moreover, the machine embodying the present invention is, because of the reduced number of component parts, durable and can operate for a substantially prolonged period of time.

Figure 1:
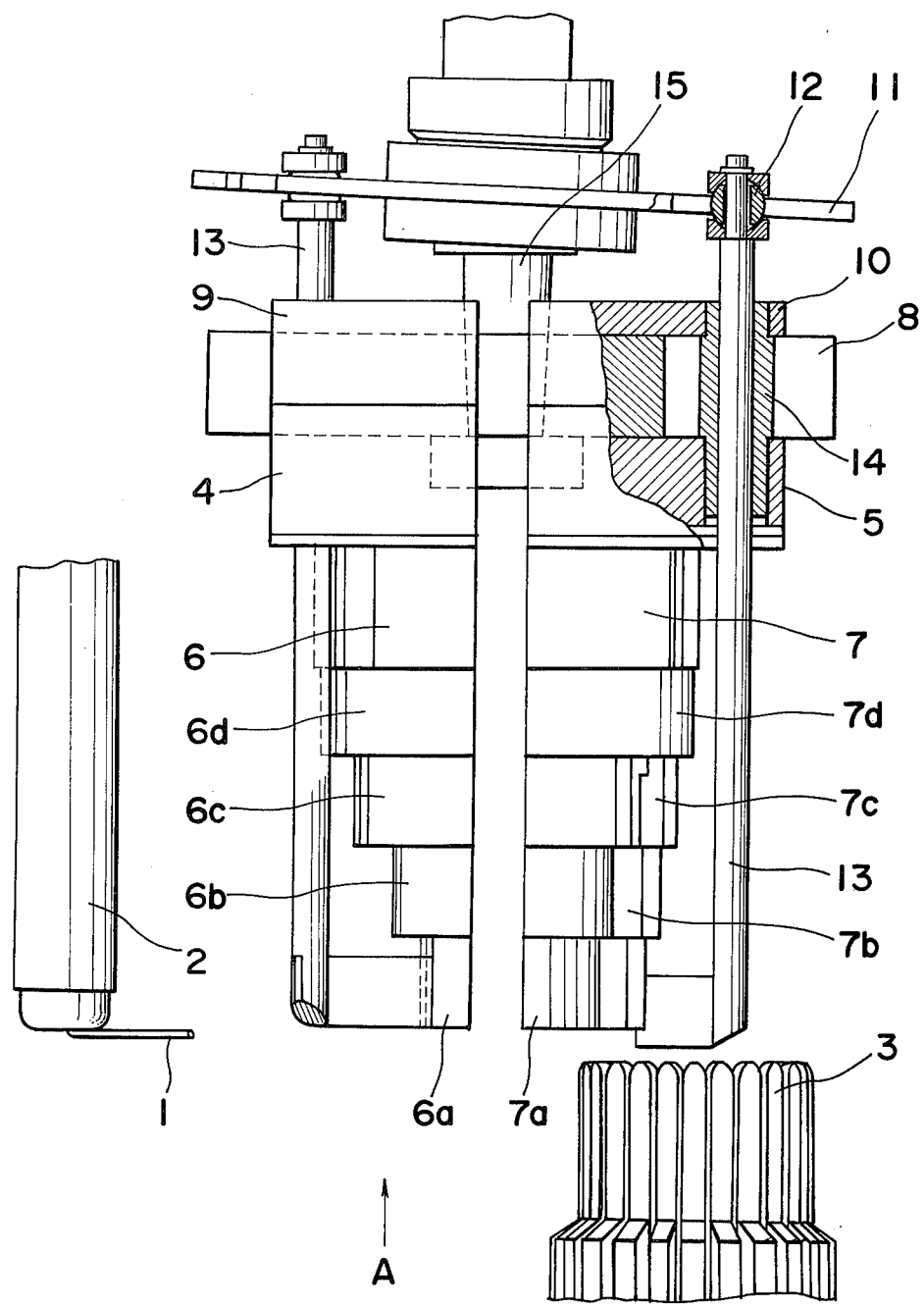
FIG. 1 is a longitudinal side view, with a portion broken away, of the former assembly and the coil receiving jig used in one type of the prior art coil forming machines.
Figure 2:
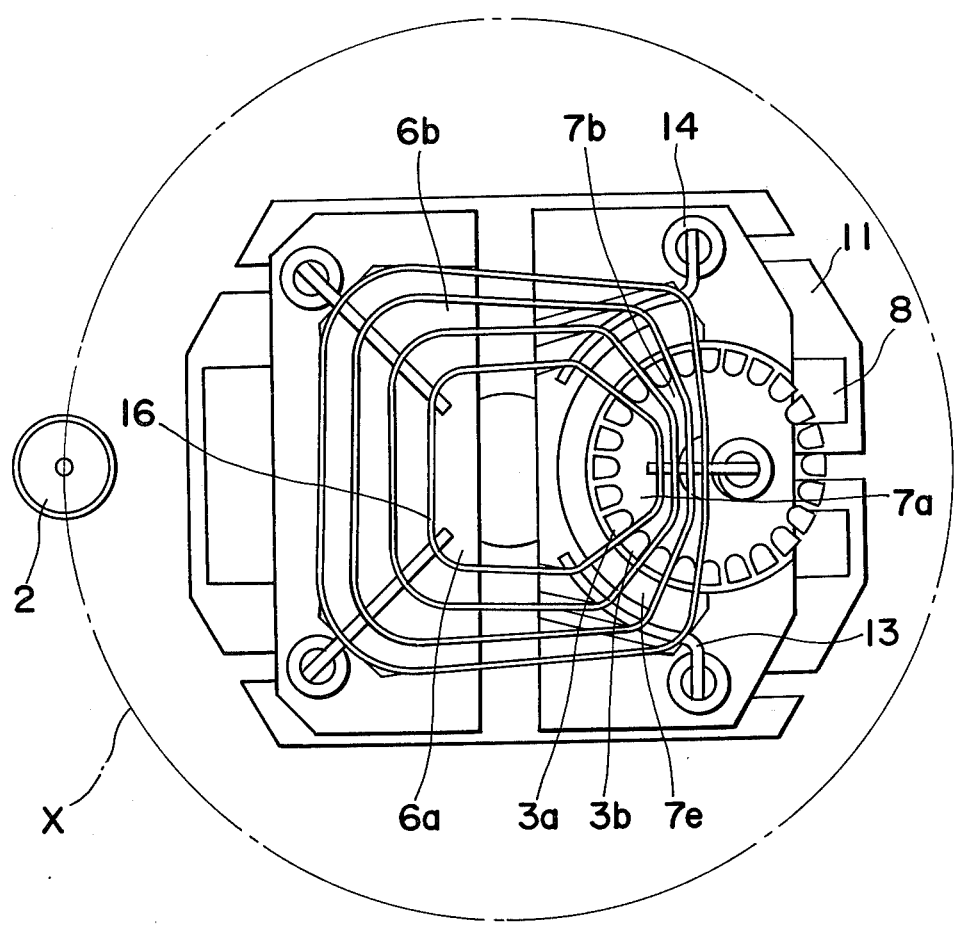
FIG. 2 is a bottom plan view of the former assembly as viewed in the direction shown by the arrow A in FIG. 1.
Figure 3:
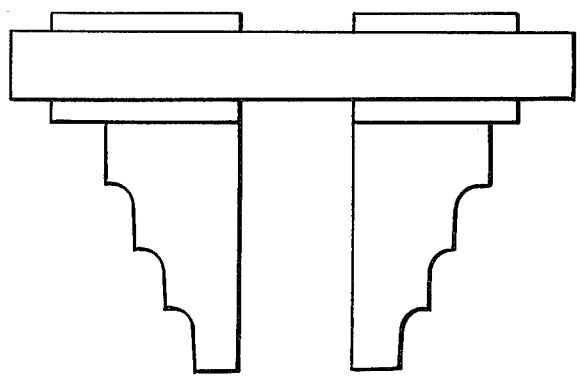
FIG. 3 is a schematic side view of the former assembly used in another type of the prior art coil forming machine.
Figure 4:
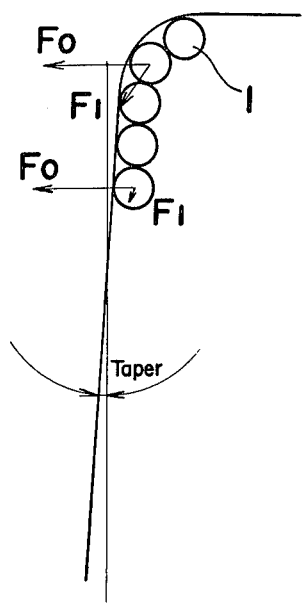
FIG. 4 is a diagram showing the state in which an electric wire is turned around the former assembly shown in FIG. 3.

In addition, as compared with the machine utilizing the former assembly of the construction shown in FIG. 3, the present invention requires no high tension on the wire being coiled and, therefore, neither the elongation of the wire nor the formation of large interstices among the turns of the wire take place. Therefore, according to the present invention, not only is the production of coils having no loss of resiliency possible, but also the insertion of the coil can readily be performed with the increased percentage of occupation of the coil relative to the slot in the former assembly. With the coil made according to the present invention, it is possible easily to assemble a high performance electric motor.

What is claimed is:

1. A coil forming machine which comprises:
   a carrier means;
   a high frequency energy generator means mounted on said carrier means for generating a high frequency vibration;
   an amplitude transducer means connected to said generator for increasing the mechanical vibrations generated by the high frequency energy generator means;
   a former assembly connected to said transducer means and around which a wire is to be wound to form a coil;
   a flier mounted adjacent said former assembly for winding the wire around the former assembly to form the coil thereon; and
   a coil receiving jig located adjacent said former assembly for supporting the coil thereon after such coil has been transferred from the former assembly.

2. A machine as claimed in claim 1, wherein said generator means and said transducer means comprise a single generator and a single transducer, and said former assembly comprises a pair of mating formers, and a plate member operatively coupling said formers to said single transducer.

3. A machine as claimed in claim 1, wherein said former assembly comprises a pair of mating formers, and said generator means and said transducers means comprise two generators and two transducers, a generator and transducer for each of said formers, the respective formers being connected to the corresponding transducer.

* * * * *